(No Model.) 2 Sheets—Sheet 1.

A. W. BRASH.
WATER MOTOR.

No. 469,536. Patented Feb. 23, 1892.

Witnesses
A. J. Schwartz
C. S. Frye

A. W. Brash
Inventor
By W. T. Fitzgerald & Co.
Attorneys (No Model.) 2 Sheets—Sheet 2.
A. W. BRASH.
WATER MOTOR.
No. 469,536. Patented Feb. 23, 1892.
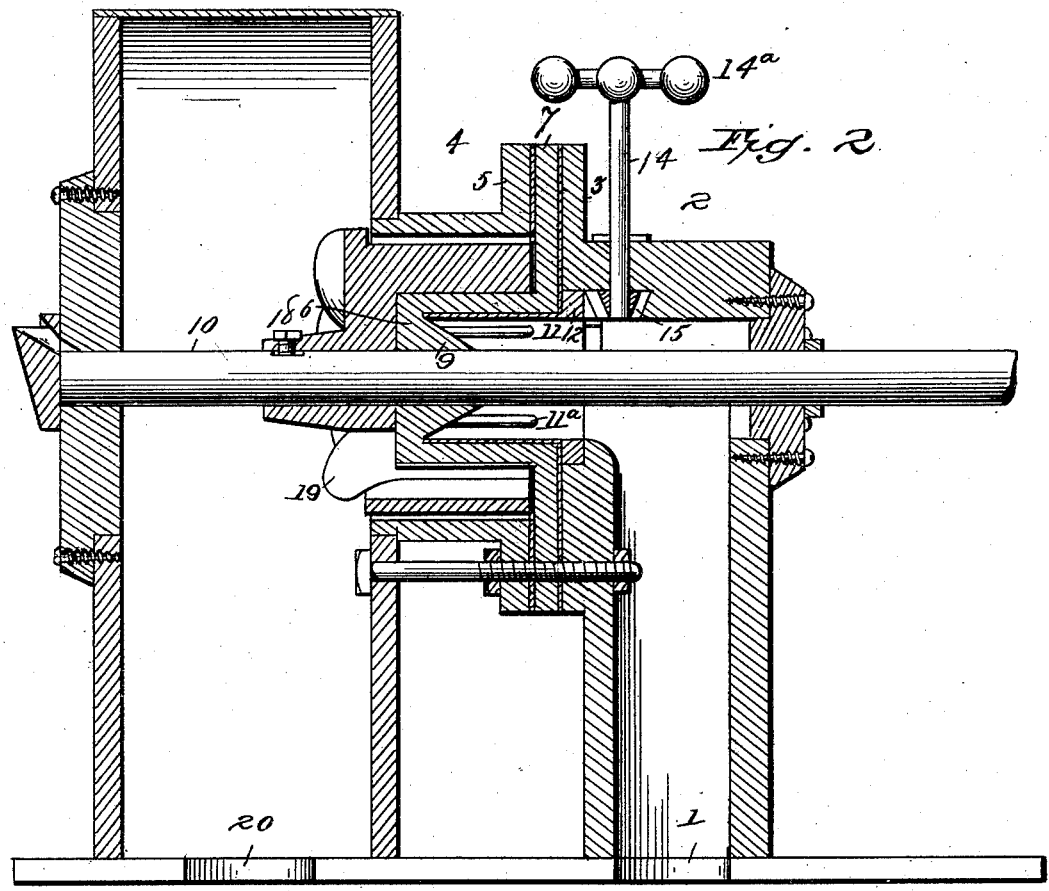
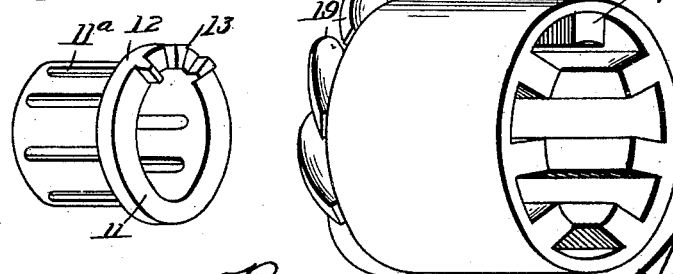
Witnesses
A. J. Schwartz
C. S. Fry
By W. T. FitzGerald
Attorneys.
A. W. Brash
Inventor

UNITED STATES PATENT OFFICE.

ALBERT W. BRASH, OF NEWARK, SOUTH DAKOTA.

WATER-MOTOR.

SPECIFICATION forming part of Letters Patent No. 469,536, dated February 23, 1892.

Application filed July 18, 1891. Serial No. 399,932. (No model.)

*To all whom it may concern:*

Be it known that I, ALBERT W. BRASH, a citizen of the United States, residing at Newark, in the county of Marshall and State of South Dakota, have invented certain new and useful Improvements in Water-Motors; and I do hereby declare the following to be a full, clear, and exact description of the invention, such as will enable others skilled in the art to which it appertains to make and use the same.

My invention consists in a new and improved water-motor which can be used in connection with an Artesian well or any other source of water-power, and it will be hereinafter fully described and claimed.

Figure 1:
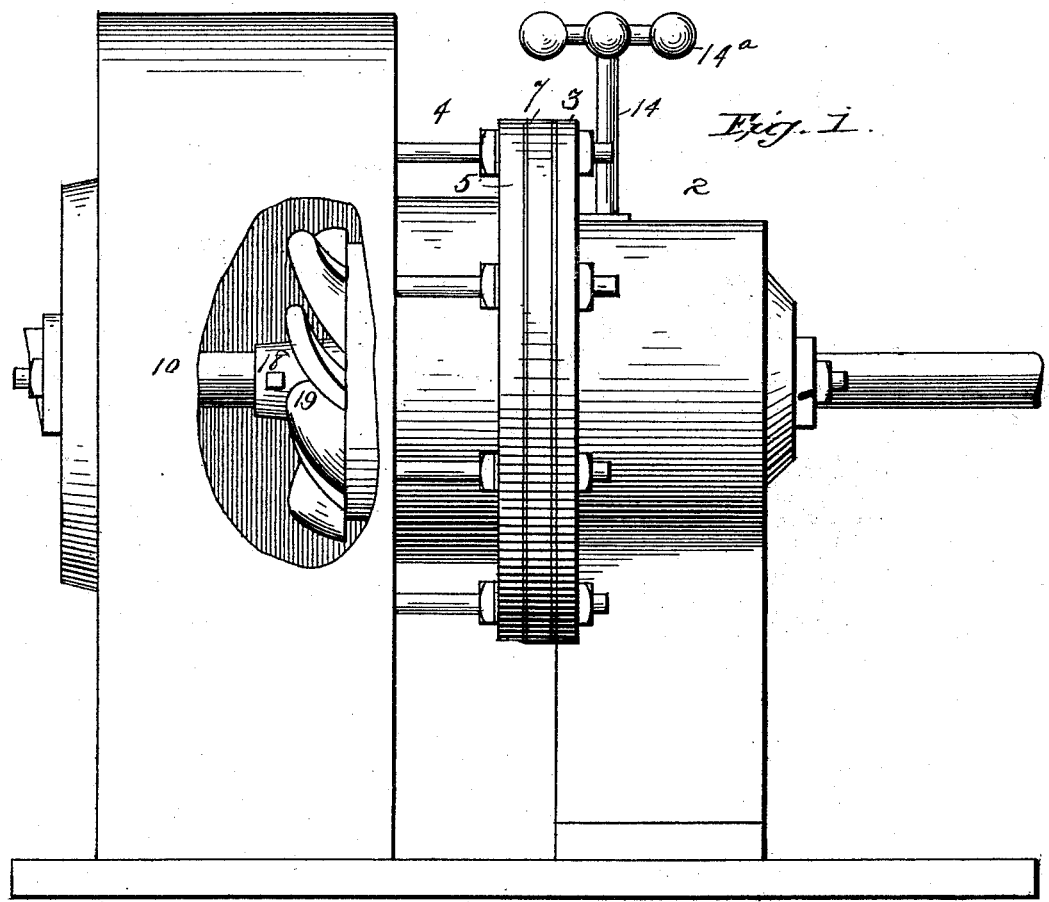
Figure 3:
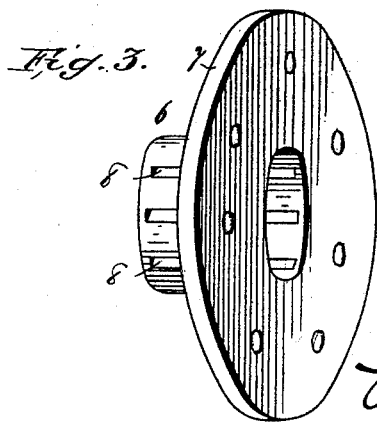

Referring to the accompanying drawings, Figure 1 is a side elevation of the entire motor with a part of the outer casing broken away. Fig. 2 is a central longitudinal vertical sectional view. Fig. 3 illustrates in detail the stationary core or casing. Fig. 4 illustrates in detail the circular gate which controls the flow of water to the wheel. Fig. 5 illustrates in detail the combined revolving cylinder and wheel.

Referring to the several parts by their designating-numerals, 1 indicates an inlet-opening formed in one end of the motor-casing, through which the water flows into the motor. The end section 2 of the casing in which this inlet is formed is formed at one end with a large circular flange 3. The main section 4 of the casing is formed at one end with the annular flange 5, corresponding in size to the flange 3.

6 indicates the stationary core or casing, which is formed at one end with the annular flange 7, which fits between the annular flanges 3 and 5 of the casing, and is there firmly bolted to hold the cylindrical core 6 stationary in its operative position. The cylindrical core 6 is formed with a series of longitudinal slots 8, and at its inner end is formed with the conical bearing 9, through which the drive-shaft 10 passes.

Within the cylindrical casing 6 fits the cylindrical valve or casing 11, which is formed with the series of longitudinal slots 11ª, and is formed at its outer end with the flange 12, having the teeth or cogs 13.

14 indicates a vertical rod mounted in the upper part of the casing-section 2 and having at its lower end a pinion 15, which meshes with the teeth 13 on the end of the valve. A small hand-wheel 14ª is secured on the upper end of the rod 14 for convenience in turning it. The drive-shaft 10 is mounted at its ends in suitable bearings in the ends of the outer casing and passes through the conical bearing 9, formed at the inner end of the stationary core 6. Upon this shaft, within the main body of the casing, is rigidly secured the combined cylinder and wheel. (Shown in detail in Fig. 5 of the drawings.) This consists of a cylindrical body 16, which fits around the stationary core 6, leaving an annular space between it and the core. The inner side of this cylinder is formed with the series of wide longitudinal ribs 17, the width of which is equal to the width of the space between the stationary core and the cylinder 16. The outer ends of these ribs are connected to a hub 18, formed at the outer end of the cylinder, and at the outer end of each rib is formed a dished and curved blade 19 of substantially the form shown in the drawings. The drive-shaft 10 passes through the hub 18, and the combined cylinder and wheel is rigidly secured to the shaft either by a set-screw, as shown in the drawings, or by being keyed firmly thereon.

20 indicates the outlet or discharge opening of the casing, arranged usually at the under side of the outer casing, as shown in the sectional view, Fig. 2.

In operation the water enters the motor, passing through the inlet-passage 1, having free access to the interior of the cylindrical valve 11. This valve can be readily turned by turning the hand-wheel 14ª to open or close the longitudinal slots 8 of the stationary core 6, as will be readily understood. When the valve is open, the water will rush through the slots 8 of the stationary core into the space between this core and the cylindrical body 16 of the water-wheel, passing outward between the ribs 17, until it reaches the outer end of the cylinder, where it makes its escape between the curved blades 19, and it will be seen that owing to the form and curvature of these blades the water pressing against them will revolve the wheel rapidly in the direction indicated by the arrow, thus revolving the drive-shaft 10 rapidly with the water-wheel. The water after passing from the wheel makes its escape from the casing through the outlet 20.

From the foregoing description, taken in connection with the accompanying drawings, the construction and operation of my invention will be readily understood.

It will be seen that my new and improved water-motor is simple and strong in its construction, and that it is especially adapted for use with an Artesian well, the inlet 1 being connected directly with the well. It can, however, be used with any suitable water-power.

Having thus described my invention, what I claim, and desire to secure by Letters Patent, is—

1. In a water-motor substantially as described, the combination, with the casing having the inlet and discharge openings, the drive-shaft journaled in said casing, the wheel fixedly mounted on said shaft and comprising the hub, the cylindrical body, the longitudinal ribs on the inside of the cylinder, and the series of dished and curved blades arranged at the outer ends of the longitudinal ribs, the valve-cylinder having longitudinal slots, and a suitable means for adjusting said cylinder, of the stationary cylindrical core arranged between the valve-cylinder and the cylinder of the wheel and having longitudinal slots and an end flange, substantially as specified.

2. In a water-motor substantially as described, the combination, with the casing having the inlet and discharge openings, the drive-shaft journaled in said casings, and the wheel fixedly mounted on said shaft and comprising the hub, the cylindrical body, the longitudinal ribs on the inside of the cylinder, and the series of dished and curved blades arranged at the outer ends of the longitudinal ribs, of the stationary cylindrical core within the body of the wheel, having longitudinal slots and an annular flange, the valve-cylinder movable within the stationary core and having longitudinal slots and an end flange provided with teeth, and a rod carrying a pinion at its lower end engaging the teeth of the valve-cylinder, substantially as specified.

In testimony whereof I affix my signature in presence of two witnesses.

ALBERT W. BRASH.

Witnesses:
S. C. SWAYNE,
G. A. LINDQUIST.